(12) United States Patent
Chandrasekhar et al.

(10) Patent No.: US 9,954,828 B1
(45) Date of Patent: Apr. 24, 2018

(54) PROTECTION OF DATA STORED IN THE CLOUD

(71) Applicant: Trend Micro Incorporated, Tokyo (JP)

(72) Inventors: Bharath Kumar Chandrasekhar, Sunnyvale, CA (US); Shuang Ji, Los Gatos, CA (US)

(73) Assignee: Trend Micro Incorporated, Tokyo (JP)

( * ) Notice: Subject to any disclaimer, the term of this patent is extended or adjusted under 35 U.S.C. 154(b) by 116 days.

(21) Appl. No.: 15/070,878

(22) Filed: Mar. 15, 2016

Related U.S. Application Data

(63) Continuation of application No. 14/223,807, filed on Mar. 24, 2014.

(51) Int. Cl.
  H04L 29/06 (2006.01)
  H04L 9/08 (2006.01)

(52) U.S. Cl.
  CPC ........ H04L 63/0428 (2013.01); H04L 9/0822 (2013.01); *H04L 2209/24* (2013.01)

(58) Field of Classification Search
  CPC . H04L 63/0428; H04L 9/0822; H04L 9/0891; H04L 12/246; H04L 12/40104; H04L 29/06; H04L 29/06666
  See application file for complete search history.

(56) References Cited

U.S. PATENT DOCUMENTS

| | | | | |
|---|---|---|---|---|
| 2002/0031230 | A1* | 3/2002 | Sweet | H04L 63/0428 380/278 |
| 2008/0133911 | A1* | 6/2008 | Eisen | H04L 63/0428 713/168 |
| 2009/0198997 | A1* | 8/2009 | Yeap | H04L 63/0823 713/155 |
| 2010/0191975 | A1* | 7/2010 | Chase | G06F 21/6254 713/176 |
| 2012/0331088 | A1* | 12/2012 | O'Hare | G06F 21/6227 709/214 |
| 2013/0159699 | A1* | 6/2013 | Torkkel | H04L 9/0897 713/155 |
| 2014/0019753 | A1* | 1/2014 | Lowry | H04L 63/062 713/155 |
| 2014/0173705 | A1* | 6/2014 | Manning | H04L 63/08 726/6 |
| 2014/0282936 | A1* | 9/2014 | Fitzgerald | H04L 63/10 726/6 |

* cited by examiner

*Primary Examiner* — Krisna Lim
(74) *Attorney, Agent, or Firm* — Okamoto & Benedicto LLP

(57) ABSTRACT

A system for protecting data stored in the cloud includes a computing device that generates a plaintext encryption key and encrypts the plaintext encryption key using a credential of a customer that uses a cloud application. The computing device encrypts plaintext data using the encryption key and forwards the encrypted data to a cloud computer system that hosts the cloud application. The plaintext data can be received from a cloud application client that runs in the computing device or from another computing device that hosts the cloud application client. The encrypted encryption key can be stored in and retrieved from a key server.

20 Claims, 12 Drawing Sheets

PROTECTION OF DATA STORED IN THE CLOUD

CROSS-REFERENCE TO RELATED APPLICATION

This application is a continuation of U.S. application Ser. No. 14/223,807, filed on Mar. 24, 2014, which is incorporated herein by reference in its entirety.

BACKGROUND OF THE INVENTION

1. Field of the Invention

The present invention relates generally to computer security, and more particularly but not exclusively to methods and systems for protecting data stored in the cloud.

2. Description of the Background Art

"Cloud applications" are remotely provided computer services that are accessible over a public computer network, such as the Internet. Cloud applications can be provided by a third party referred to as a "cloud application provider." The cloud applications are hosted by a cloud computer system, which can comprise one or more computers accessible over the Internet. Those who subscribe to use the cloud applications, who are also referred to as "customers," remotely access a cloud application using a client device running a cloud application client, which can be a web browser. A cloud application, such as a cloud storage service, can involve storing data in the cloud. Because the data is off-premise and not in a device that is under direct control of the customer, the data is vulnerable to unauthorized access. Although encryption can protect the data in the cloud, conventional encryption techniques are relatively cumbersome for the average customer.

SUMMARY

In one embodiment, a system for protecting data stored in the cloud includes a computing device that generates a plaintext encryption key and encrypts the plaintext encryption key using a credential of a customer that uses a cloud application. The computing device encrypts plaintext data using the plaintext encryption key and forwards the encrypted data to a cloud computer system that hosts the cloud application. The plaintext data can be received from a cloud application client that runs in the computing device or from another computing device that hosts the cloud application client. The encrypted encryption key can be stored in and retrieved from a key server.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
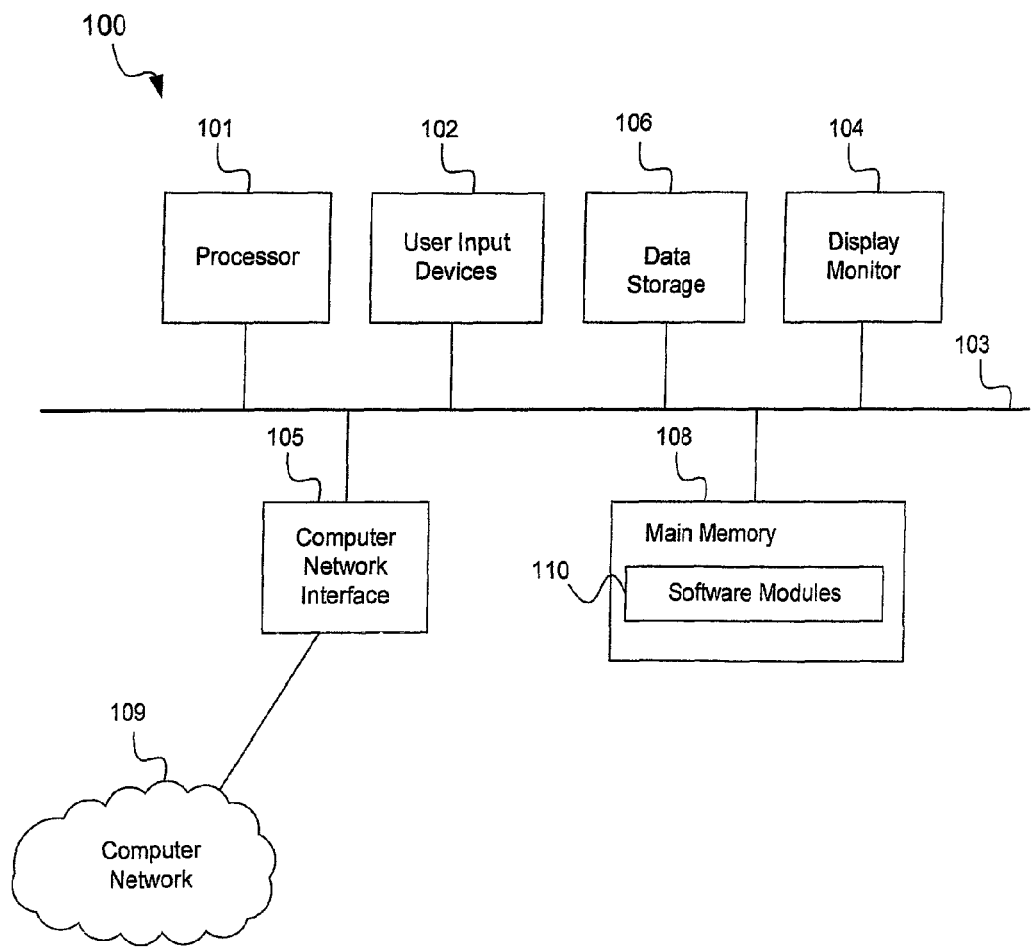
FIG. 1 shows a schematic diagram of a computer that can be employed with embodiments of the present invention.

Referring now to FIG. 1, there is shown a schematic diagram of a computer 100 that can be employed with embodiments of the present invention. The computer 100 can be employed as a client device, server computer system, router, and other computers described below. The computer 100 can have fewer or more components to meet the needs of its application. The computer 100 can include one or more processors 101. The computer 100 can have one or more buses 103 coupling its various components. The computer 100 can include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 can be coupled to a computer network 109.

The computer 100 is a particular machine as programmed with software modules 110. The software modules 110 comprise computer-readable program code stored non-transitory in the main memory 108 for execution by the processor 101. As an example, the software modules 110 can comprise a cloud application client and a cloud data protection module when the computer 100 is configured as a client device. As another example, the software modules 110 can comprise a data protection module when the computer 100 is configured as a router or proxy server computer.

The computer 100 can perform its functions by executing the software modules 110. The software modules 110 can be loaded from the data storage device 106 to the main memory 108. An article of manufacture can be embodied as computer-readable storage medium including instructions that when executed by a computer causes the computer to be operable to perform the functions of the software modules 110.

Figure 2:
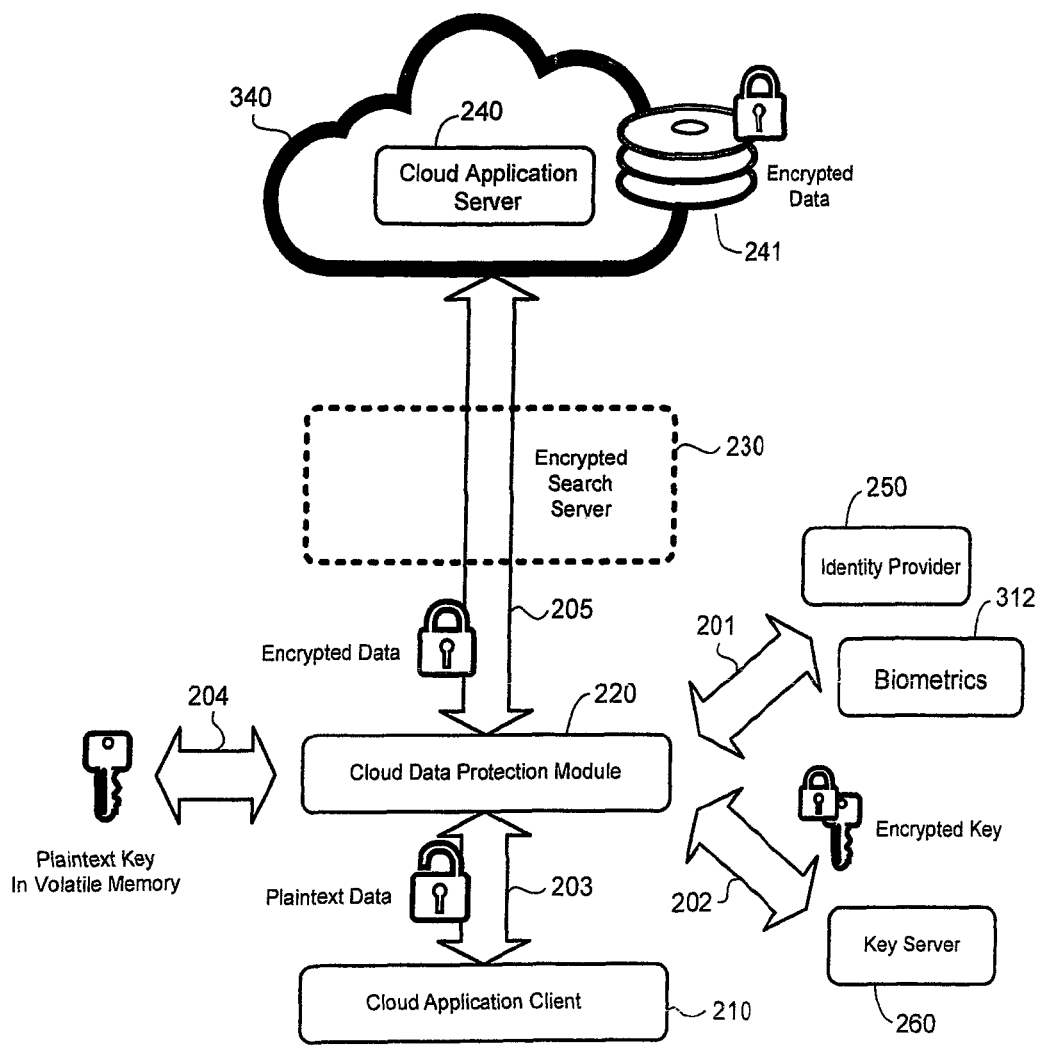
FIG. 2 shows a schematic diagram of a cloud data protection system in accordance with an embodiment of the present invention.

FIG. 2 shows a schematic diagram of a cloud data protection system in accordance with an embodiment of the present invention. In the example of FIG. 2, the cloud data protection system comprises a cloud application client 210, a cloud data protection module 220, an encrypted search server 230, a cloud application server 240, an identity provider 250, and a key server 260.

The components of the cloud data protection system can communicate by interprocess communication, over a private computer network, or over the Internet depending on how the components are implemented. For example, the cloud application client 210 and the cloud data protection module 220 can communicate by interprocess communication or some other communication technique between software modules when the cloud application client 210 and the cloud data protection module 220 are running on the same client device. As another example, the cloud application client 210 and the cloud data protection module 220 can communicate over a private computer network of the customer when the cloud application client 210 and the cloud data protection module 220 are separately running on a client device and a router, respectively, within the private computer network, i.e., on-premise. Yet another example, the cloud application client 210 and the cloud data protection module 220 can communicate over the Internet when the cloud application client 210 is running on a client device and the cloud data protection module 220 is running on a server computer system on the Internet.

In the example of FIG. 2, the cloud application server 240 comprises software that stores data in the cloud. The cloud application server 240 is hosted on a cloud computer system 340, which can comprise one or more server computer systems for hosting cloud applications. In the example of FIG. 2, the cloud application server 240 services requests from client devices to store data in and retrieve data from the data storage device 241. The data storage device 241 can comprise one or more disk drives, network attached storage (NAS) devices, or other non-volatile storage devices. As will be more apparent below, the cloud data protection module 220 encrypts data that are to be stored in the cloud. Accordingly, in the example of FIG. 2, the cloud application server 240 stores encrypted data in the data storage device 241 for the cloud application client 210.

The cloud application client 210 can comprise software for communicating with the cloud application server 240. The cloud application client 210 can be a general purpose, commercially available web browser, for example. The cloud data protection module 220 can be a browser plug-in in that example. The cloud application client 210 can also be a dedicated client software that is specifically tailored to work with the cloud application server 240. For example, the cloud application client 210 can be a mobile application, which is commonly referred to as an "app", that is designed to work specifically with the cloud application server 240. Such an app can be modified (e.g., by app wrapping) to include the cloud data protection module 220 as a control layer, for example.

The cloud data protection module 220 can comprise software that receives a customer's credential (e.g., from the identity provider 250 or locally by biometrics 312), locally generates a plaintext (i.e., unencrypted) encryption key for the customer, uses the plaintext encryption key to encrypt plaintext data that are received from the cloud application client 210, encrypts the encryption key using the customer's credential, provides the encrypted encryption key to the key server 260 for storage, and forwards the encrypted data to the cloud application server 240 for storage in the cloud. In the reverse data flow direction, the cloud data protection module 220 receives the encrypted data from the cloud application server 240, receives the encrypted encryption key from the key server 260, receives the customer's credential, uses the customer's credential to decrypt the encrypted encryption key to recover the plaintext encryption key, and uses the plaintext encryption key to decrypt the encrypted data to recover the plaintext data.

The encrypted search server 230 is an optional feature of the cloud data protection system that allows encrypted data stored in the cloud to be searched. In one embodiment, the encrypted search server 230 is implemented using algorithms for pairing-based cryptography developed by Stanford University, searching over multiple key encrypted data developed by the Massachusetts Institute of Technology, or other conventional algorithms for searches on encrypted data. The encrypted search server 230 can send and receive communications over the Internet by proxy, routing, or other way without detracting from the merits of the present invention.

An example operation for storing encrypted data in the cloud is now explained. The customer can log in to the cloud data protection system by providing his credential to the cloud data protection module 220 by way of the identity provider 250 or by biometrics 312, for example. In one embodiment, the identity provider (IDP) 250 provides federated identity authentication, such as those provided by the Facebook™ service, Google™ service, and Yahoo!™ service. For example, the identity provider can provide a token that can be used for authentication and look up of the customer's encryption key. Upon authentication, the identity provider 250 or the biometrics 312 provides the customer's credential to the cloud data protection module 220 (see arrow 201). The customer can also log in to the cloud data protection system by providing a credential, such as a password and user name, directly to the cloud data protection module 220 by way of a login message box or other user interface, for example. The cloud data protection module 250 associates the customer's credential with the customer's encryption key.

When the customer is a new user of the cloud data protection system, the cloud data protection module 220 generates an encryption key for the customer. In one embodiment, the cloud data protection module 220 generates a public key and a private key for the customer. For example, the cloud data protection module 220 can employ the RSA cryptosystem, elliptic curve cryptography, or other public-key cryptography algorithm to generate the public key and the private key of the customer. As can be appreciated, embodiments of the present invention can also employ cryptography algorithms other than public-key cryptography. The cloud data protection system can keep track of customer credentials and corresponding encryption keys by way of a local or remote database, for example.

The cloud data protection module 220 encrypts the customer's private key using the customer's credential. For example, the cloud data protection module 220 can encrypt the customer's private key using the customer's credential (e.g., password, user name, or both) as a symmetric key using a conventional symmetric key encryption algorithm. The customer's public key is not encrypted. The cloud data protection module 220 provides the customer's public key and encrypted private key to the key server 260 for remote storage (see arrow 202). While operating with the cloud application client 210, the cloud data protection module 220 keeps the customer's plaintext private key in volatile memory, such as in main random access memory (RAM).

This ensures that the plaintext private key is gone when the computing device running the cloud data protection module 220 is rebooted or powered off. The cloud data protection module 220 also deletes the plaintext private key when done, thus requiring retrieval of the encrypted private key from the key server 260 for the next session.

In the course of working with the cloud application server 240, the cloud application client 210 provides plaintext data to the cloud data protection module 220 (see arrow 203). The plaintext data can comprise a Microsoft Office™ document, a photo, or other computer files to be stored in the cloud. The data path between the cloud application 210 and the cloud data protection module 220 is depicted with an open lock to indicate that data transferred between the cloud data protection module 220 and the cloud application client 210 are in plaintext. The cloud data protection module 220 encrypts the plaintext data using the plaintext private key stored in volatile memory (see arrow 204) and forwards the encrypted data to the cloud application server 240 (see arrow 205). The data path between the cloud data protection module 220 and the cloud application server 240 is depicted with a locked key to indicate that data transferred between the cloud application server 240 and the cloud data protection module 220 are encrypted. The encrypted data can be optionally forwarded through the encrypted search server 230 in embodiments where searches are performed on encrypted data stored in the cloud.

Once logged in the cloud data protection system, the customer can retrieve encrypted data from the cloud in the reverse data flow direction. More specifically, encrypted data stored in the data storage device 241 in the cloud are transmitted by the cloud application server 240 to the cloud data protection module 220 (see arrow 205). The encrypted data can forwarded by way of the encrypted search server 230 if one is included in the implementation. The cloud data protection module 220 decrypts the encrypted data back to the plaintext data using the customer's plaintext private key (see arrow 204) and thereafter provides the plaintext data to the cloud application client 210 (see arrow 203). If the plaintext private key is not locally available (e.g., the customer just recently logged in to the system), the cloud data protection module 220 obtains the customer's credential (see arrow 201), requests the key server 260 to provide the customer's encrypted private key (see arrow 202), decrypts the encrypted private key back to the plaintext private key using the customer's credential, and decrypts the encrypted data using the plaintext private key.

Figure 3:
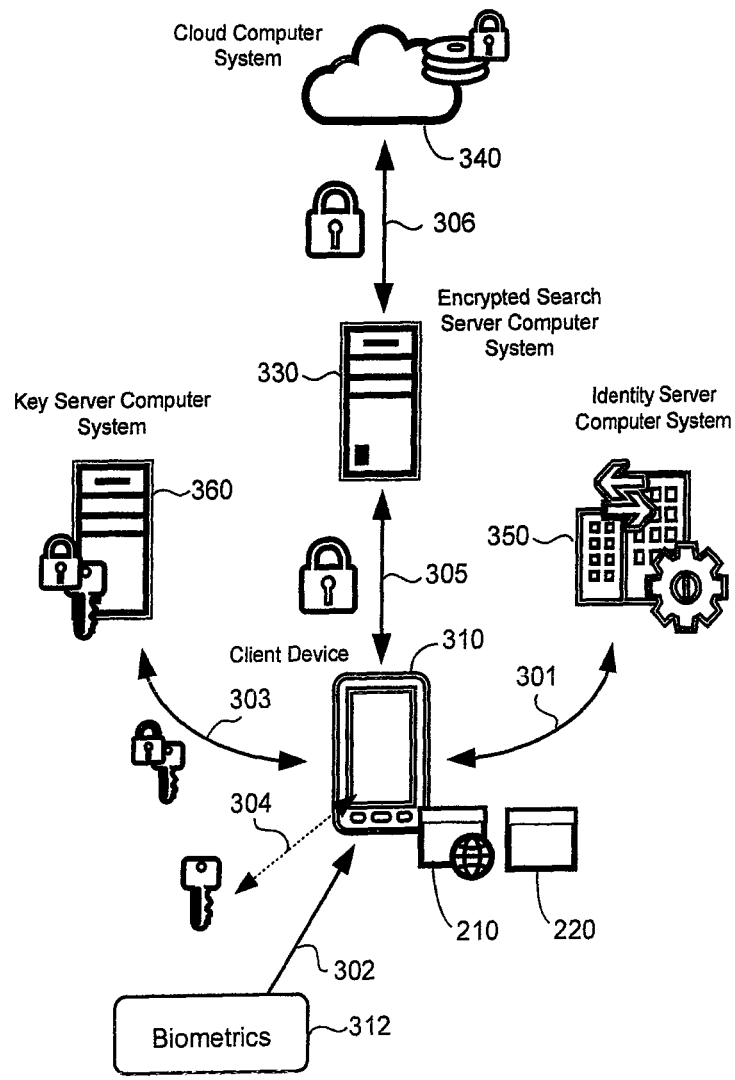
FIGS. 3-5 show schematic diagrams of cloud data protection systems in accordance with embodiments of the present invention.

As will be more apparent in the discussion of FIGS. 3-5 below, a cloud data protection system can be implemented a variety ways without detracting from the merits of the present invention. Referring first to FIG. 3, there is shown an embodiment of a cloud data protection system where the cloud application client 210 and the cloud data protection module 220 are running on the same client device 310. In the example of FIG. 3, the client device 310 is a mobile computing device in that it is running a mobile operating system, such as the ANDROID operating system or the IOS operating system, for example. More specifically, the client device 310 can be a smartphone (e.g., IPHONE smartphone or ANDROID smartphone) or tablet (e.g., IPAD tablet or ANDROID tablet). The client device 310 can include hardware and software for biometric authentication, such as for receiving and processing the customer's fingerprint for identification.

The key server 260 can be implemented on a key server computer system 360 and the identity provider 250 can be implemented on an identity server computer system 350. The encrypted search server 230, when included, can be implemented on an encrypted search server computer system 330 that is on a data path between the client device 310 and the cloud computer system 340. Generally speaking, a computer system can comprise one or more computers.

In the example of FIG. 3, the customer logs in to the cloud data protection system by federated authentication provided by the identity server computer system 350 (see arrow 301), by providing biometric input (see arrow 302), by simply entering his credential into a user interface generated by the cloud data protection module 220, or some other way. The cloud data protection module 220 locally generates an encryption key (e.g., a private key with a corresponding public key) in the client device 310. The cloud data protection module 220 can encrypt the encryption key (e.g., the private key) and decrypt the resulting encrypted encryption key using the customer's credential. The cloud data protection module 220 stores the encrypted encryption key in the key server computer system 360 and retrieves the encrypted encryption key from the key server computer system 360 as needed (see arrow 303). Because the encryption key is locally generated in the client device 310 and is in encrypted form as transmitted to or received from the key server computer system 360, the encryption key is in plaintext form only in the client device 310.

The cloud data protection module 220 uses the plaintext encryption key stored in local volatile memory of the client device 310 (see arrow 304) to encrypt the plaintext data received from the cloud application client 210 or to decrypt the encrypted data received from the cloud computer system 340 (see arrow 305). The encrypted search server computer system 330 can receive (e.g., by proxy or routing) encrypted data transmitted between the cloud computer system 340 and the client device 310 (see arrow 306).

In the example of FIG. 3, the encryption key and the data to be stored in the cloud are always transmitted out of the client device 310 in encrypted form; the encryption key and the data are in plaintext form only in the client device 210. In combination with a login procedure that employs biometrics or federated authentication and using the credential from the biometrics or federated authentication to encrypt the plaintext encryption key, the embodiment of FIG. 3 allows for secure cloud data storage that is relatively easy for the average customer to use.

Figure 4:
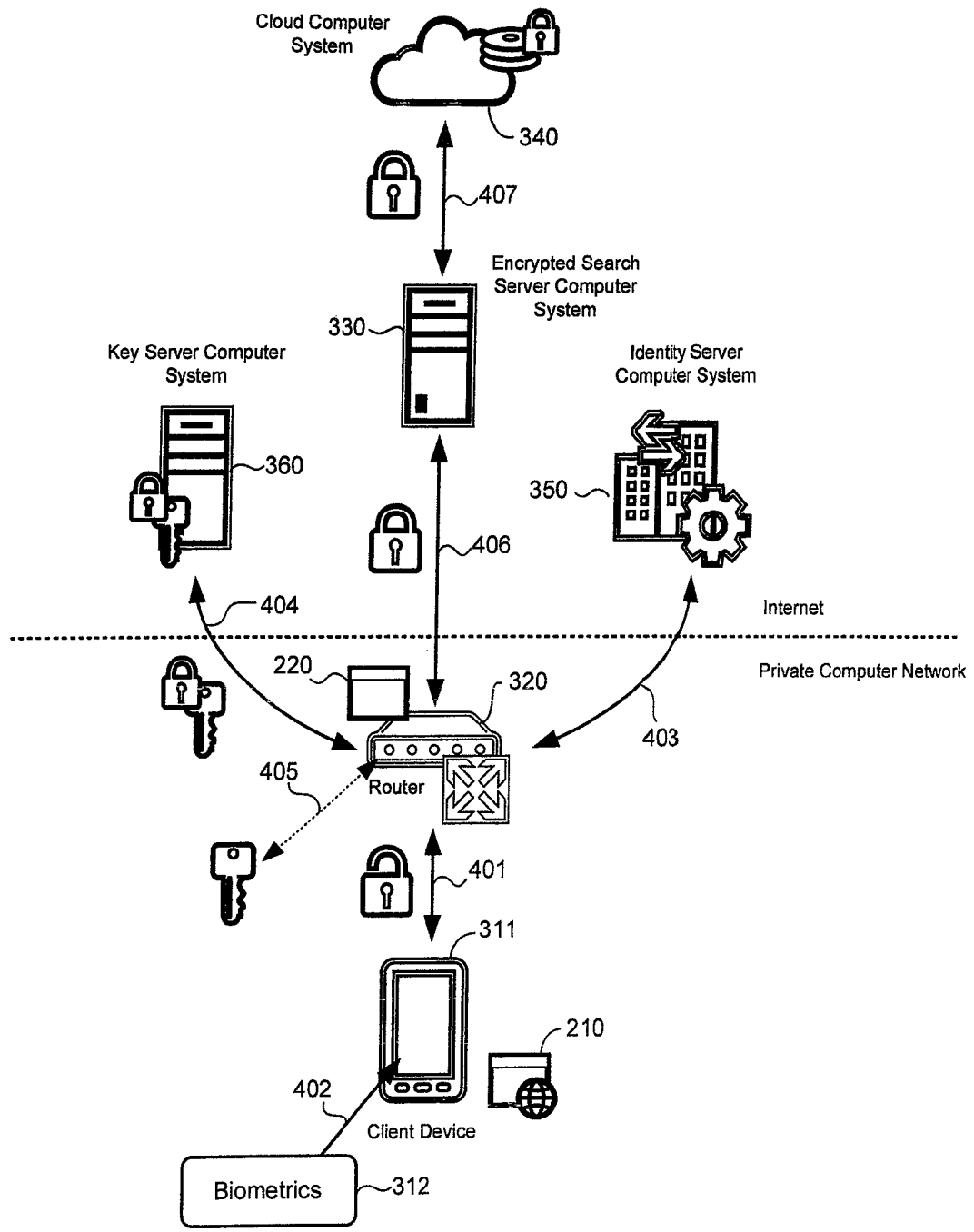

FIG. 4 shows an embodiment of a cloud data protection system where the cloud application client 210 and the cloud data protection module 220 are running on separate computing devices. In the example of FIG. 4, the client device 311 is a mobile computing device similar to the client device 310 except that the data protection module 220 is not implemented on the client device 311. Instead, the data protection module 220 is implemented on a router 320 (or other network component). In the example of FIG. 4, the router 320 and the client device 311 are both operating on-premise, i.e., within the same private computer network. The router 320 can operate as a gateway or firewall that separates the computers in the private computer network from the public computer network, which in this example is the Internet. One minor disadvantage of this embodiment compared to the embodiment of claim 3 is that the client device 311 has to be within the same private computer network as the router 320 to encrypt data to be stored in the cloud computer system 340.

In the example of FIG. 4, the components of the cloud data protection system operate as previously discussed except that plaintext data exchanged between the cloud application client 210 and the cloud data protection module 220 are transmitted over the private computer network. The data path between the client device 311 and the router 320 (see arrow 401) is depicted with an open lock to indicate that data transmitted between them are in plaintext. Although less secure than in the embodiment of FIG. 3, the compromise in security is minimal and may be acceptable to some customers because the plaintext data are transmitted within the private computer network. Furthermore, the embodiment of FIG. 4 allows for relatively easy implementation because the cloud data protection module 220 can be integrated with the router 320 (e.g., in firmware) and the cloud application client 210 can be employed without or with minimal modification. Accordingly, a customer with a so-called "small office/home office" (SOHO) environment can simply commercially purchase the router 320, download the cloud application client 210 from a remote server, and use the cloud application client 210 as-is (i.e., as provided by the cloud application provider) to protect data stored in the cloud.

In the example of FIG. 4, the customer logs in to the cloud data protection system by federated authentication provided by the identity server computer system 350 (see arrow 403), by providing biometric input (e.g., fingerprint) (see arrow 402), by simply entering his credential into a user interface generated by the cloud data protection module 220, or some other way. For security reasons, the cloud data protection module 220 locally generates an encryption key in the router 320. The cloud data protection module 220 can encrypt the encryption key and decrypt the resulting encrypted encryption key using the customer's credential. The cloud data protection module 220 stores the encrypted encryption key in the key server computer system 360 and retrieves the encrypted encryption key from the key server computer system 360 as needed (see arrow 404).

The cloud data protection module 220 uses the plaintext encryption key stored in local volatile memory of the router 220 (see arrow 405) to encrypt the plaintext data received from the cloud application client 210 (see arrow 401) or to decrypt the encrypted data received from the cloud computer system 340 (see arrow 406). The encrypted search server computer system 330 can receive encrypted data transmitted between the cloud computer system 340 and the client device 311 (see arrow 407).

Figure 5:
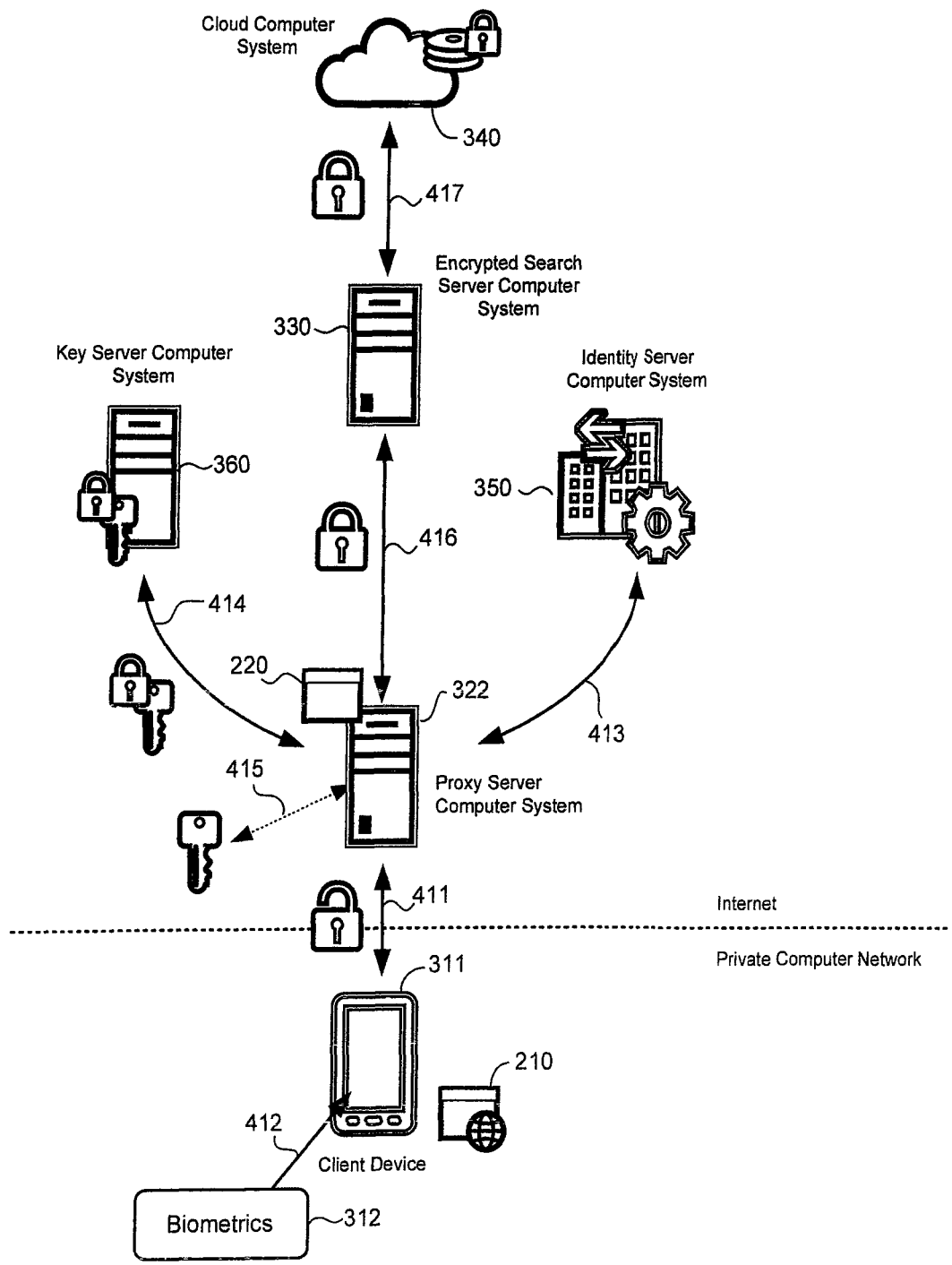

FIG. 5 shows another embodiment of a cloud data protection system where the cloud application client 210 and the cloud data protection module 220 are running on separate computing devices. In the example of FIG. 5, the cloud application client 210 is implemented on the client device 311 and the data protection module 220 is implemented on a proxy server computer system 322. In the example of FIG. 5, the proxy server computer system 322 is off-premise, i.e., outside the customer's private computer network. Like the embodiment of FIG. 3, the cloud application client 210 can work in conjunction with the cloud data protection module 220 regardless of where the client device 311 is currently operating. That is, in contrast to the embodiment of FIG. 4, the embodiment of FIG. 5 allows for encryption of data to be stored in the cloud computer system 340 even when the client device 311 is not within the private computer network.

In the example of FIG. 5, the components of the cloud data protection system operate as previously discussed except that plaintext data exchanged between the cloud application client 210 and the cloud data protection module 220 are transmitted over the Internet. The data path between the client device 311 and the proxy server computer system 322 (see arrow 411) is depicted with an open lock to indicate that data transmitted between them are in plaintext. In one embodiment, security concerns are alleviated by making the client device 311 and the proxy server computer system 322 communicate using a secure connection, such as a Secure Socket Layer (SSL) connection, for example.

In the example of FIG. 5, the customer logs in to the cloud data protection system by federated authentication provided by the identity server computer system 350 (see arrow 413), by providing biometric input (see arrow 412), by simply entering his credential into a user interface generated by the cloud data protection module 220, or some other way. As before, for security reasons, the cloud data protection module 220 locally generates an encryption key in the proxy server computer system 322. The cloud data protection module 220 can encrypt the encryption key and decrypt the resulting encrypted encryption key using the customer's credential. The cloud data protection module 220 stores the encrypted encryption key in the key server computer system 360 and retrieves the encrypted encryption key from the key server computer system 360 as needed (see arrow 414).

The cloud data protection module 220 uses the plaintext encryption key stored in local volatile memory of the proxy server computer system 322 (see arrow 415) to encrypt the plaintext data received from the cloud application client 210 (see arrow 411) or to decrypt the encrypted data received from the cloud computer system 340 (see arrow 416). The encrypted search server computer system 330 can receive encrypted data transmitted between the cloud computer system 340 and the client device 311 (see arrow 417).

Figure 6:
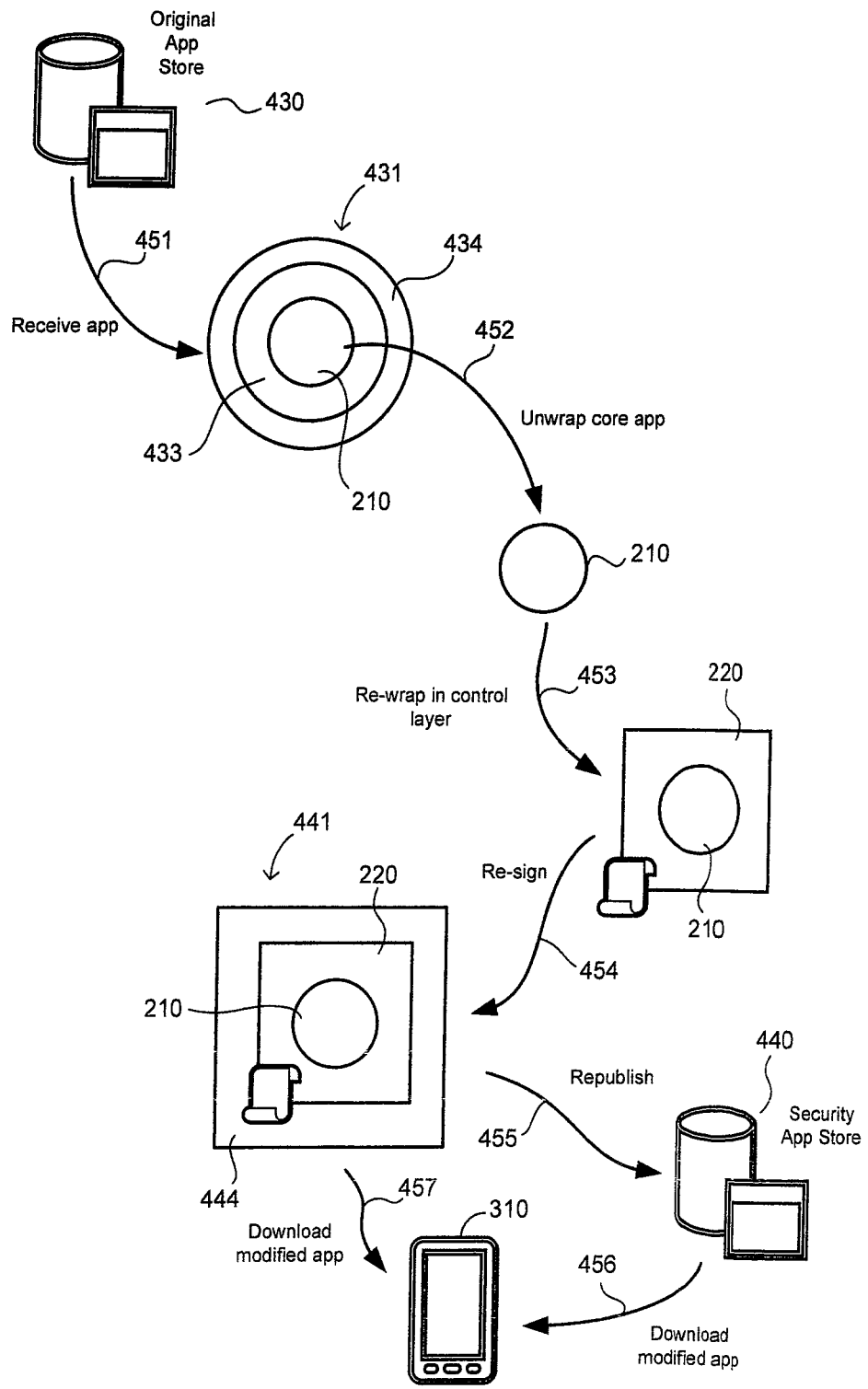
FIG. 6 shows a flow diagram of a method of modifying a mobile application to incorporate a cloud data protection module in accordance with an embodiment of the present invention.

Referring now to FIG. 6, there is shown a flow diagram of a method of modifying a mobile application to incorporate a cloud data protection module in accordance with an embodiment of the present invention. The resulting modified mobile application is suitable for use in embodiments where the cloud data protection module 220 and the cloud application client 210 are both running on the same mobile computing device, like in the embodiment of FIG. 3.

In the example of FIG. 6, an app 431 includes a cloud application client 210 that is specifically designed, i.e., not general purpose, to work with the cloud application server 240 (shown in FIG. 1) to store data in the cloud. The app 431 and the cloud application server 240 can be from the same cloud application provider. The app 431 can be made available from a publicly accessible app store (referred to herein as the "original app store" to distinguish it from the subsequently discussed "security app store"), such as the ITUNES app store or the GOOGLE MARKET app store, for example. The method of FIG. 6 can be performed using a general purpose computer.

In the example of FIG. 6, a computer where the modification is performed receives the app 431 from the server computer system that hosts the original app store 430 (see arrow 451). The app 431 can comprise a "core app" that is wrapped by one or more layers of modules. The core app can comprise an executable binary file that provides the main functionality of the app. The core app can be wrapped in a signature layer for authentication and verification, such as when the core app is signed by its publisher and/or by the app store. In the example of FIG. 6, the cloud application client 210 is the core app of the app 431. The cloud application client 210 is wrapped in a signature layer 433 that is signed by the publisher of the cloud application client 210. The signature layer 433, in turn, is wrapped in a signature layer 434 that is signed by the original app store 430.

In the example of FIG. 6, the app 431 is unwrapped to reveal its core app, which in this example is the cloud application client 210 (see arrow 452). That is, the one or more wrappers that encapsulate the cloud application client 210 are removed. The cloud application client 210 is thereafter re-wrapped in a control layer, which in this example comprises the cloud data protection module 220 (see arrow 453). The cloud application client 210 can be wrapped with the cloud data protection module 220 using a conventional app wrapping algorithm. The wrapping allows the cloud data protection module 220 to hook and intercept plaintext data, signals, and other data from the cloud application client 210. The cloud data protection module 220 in turn is wrapped in a signature layer 444 that is signed by the developer of the cloud data protection module 220 (see arrow 454). The resulting app 441 is republished by the developer of the cloud data protection module 220 (e.g., Trend Micro, Incorporated) in its own security app store 440 (see arrow 455) for download to the client device 310 (see arrow 456). Instead of being made available in the security app store 440, the app 441 can also be directly provided to the client device 310 (see arrow 457).

Figure 7:
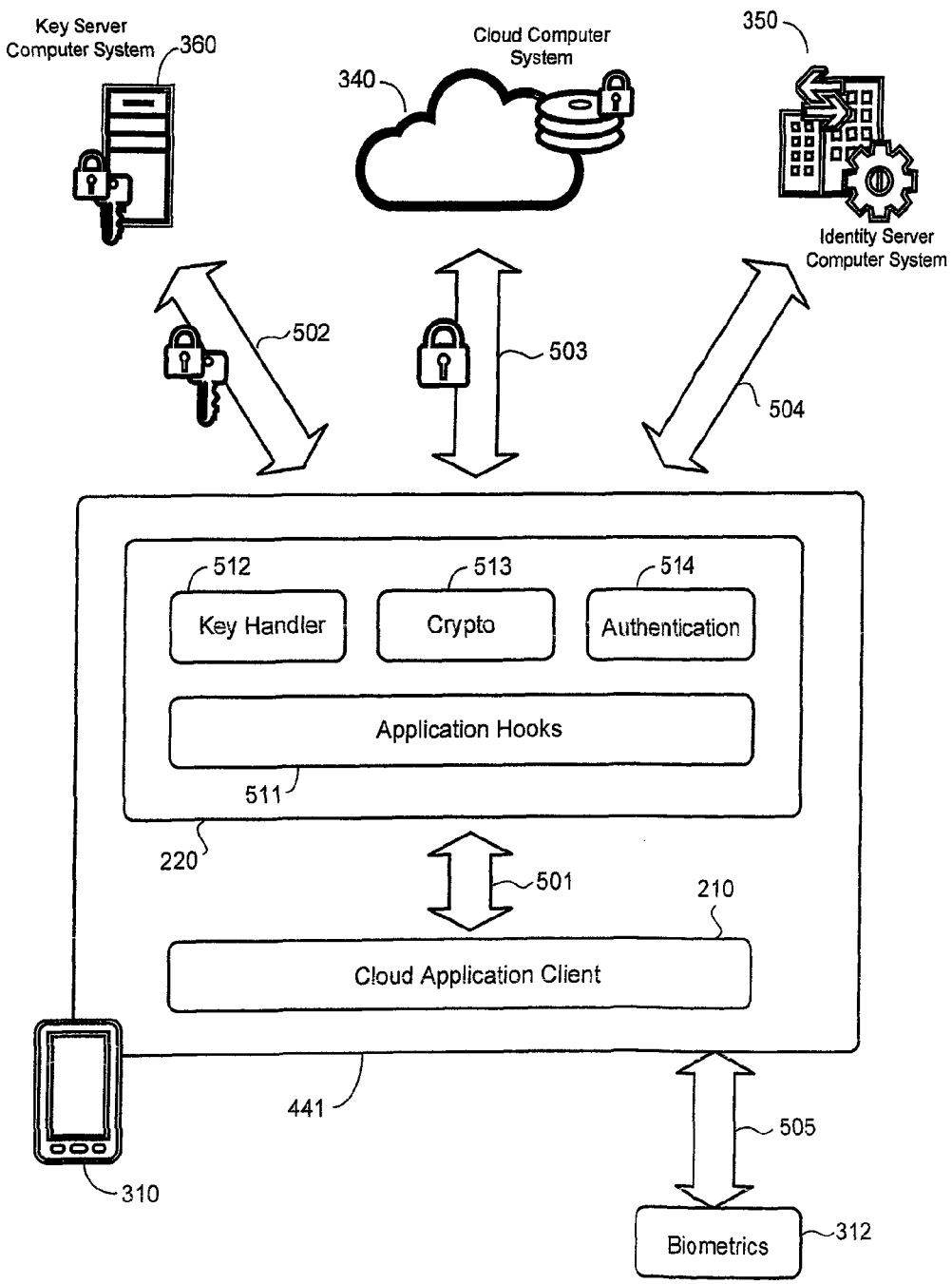
FIG. 7 shows a schematic diagram of a client device that hosts both a cloud application client and a cloud data protection module in accordance with an embodiment of the present invention.

FIG. 7 schematically shows further details of a client device that hosts both the cloud application client 210 and the cloud data protection module 220 in accordance with an embodiment of the present invention. In the example of FIG. 7, the client device 310 is operating as part of a cloud data protection system that is similar to that shown in FIG. 3. An optional encrypted search server computer system is not shown in the example of FIG. 7 for clarity of illustration.

In the example of FIG. 7, the client device 310 is a mobile computing device that is executing the app 441 (see also FIG. 6), which comprises the cloud application client 210 wrapped in the cloud data protection module 220. A cloud data protection module. 220 can comprise application hooks 511, a key handler 512, a cryptography module 513, and an authentication module 514. The components of the cloud data protection module 220 can be implemented in software, for example.

The application hooks 511 send and receive plaintext data and other data (e.g., signals or other communication) to and from the cloud application client 210 (see arrow 501). The application hooks 511 can intercept plaintext data transmitted by the cloud application client 210 by taking advantage of the hooking and interception mechanisms available from app wrapping.

The key handler 512 communicates with the key server computer system 360 to store and retrieve encrypted encryption keys. For example, the key handler 512 can provide an encrypted encryption key to the key server computer system 360 for storage and retrieve the encrypted encryption key from the key server computer system 360 as needed (see arrow 502). The key handler 512 can communicate with the key server computer system 360 over the Internet.

The cryptography module 513 encrypts plaintext data and plaintext encryption key into encrypted data and encrypted encryption key, respectively. In one embodiment, the cryptography module 513 employs an asymmetric public-key encryption algorithm to encrypt the plaintext data and a symmetric key encryption algorithm to encrypt the encryption key. For example, the cryptography module 513 can generate a private key-public key pair for a customer and use the private key to encrypt the plaintext data. The cryptography module 513 can thereafter encrypt the private key in accordance with a symmetric key encryption algorithm that uses the customer's credential as the symmetric key. This allows the cryptography module 513 to use the customer's credential to decrypt the encrypted private key as received from the key server computer system 360 and to use the resulting plaintext private key to decrypt the encrypted data received from the cloud computer system 340. The cryptography module 513 can send and receive encrypted data to and from the cloud computer system 340 over the Internet (see arrow 503).

The authentication module 514 verifies that the customer is authorized to use the cloud data protection system by receiving and authenticating the customer's credential. The authentication module 514 can receive the customer's credential from the identity server computer system 350 over the Internet (see arrow 504) or locally from biometrics input (312; see arrow 505). The authentication module 514 can also receive the customer's credential by providing a user interface where the customer can enter his credential. The authentication module 514 can locally or remotely access a listing of customer credentials that are authorized to access the cloud data protection system. For example, the customer can register with a registration server (not shown) to receive a credential, and the registration server can forward the registered credential to the authentication module 514.

Figure 8:
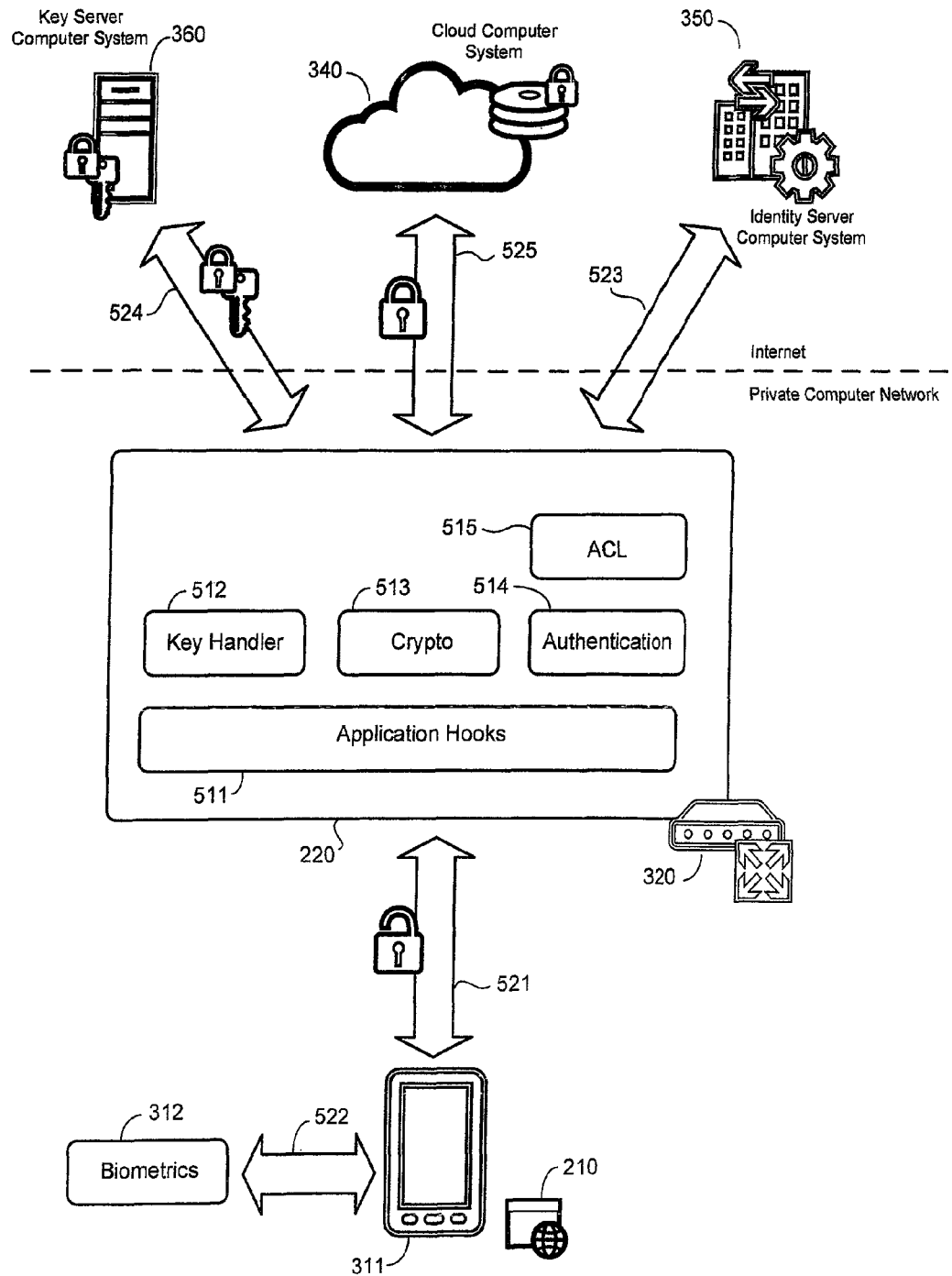
FIG. 8 shows a schematic diagram of an on-premise network component that hosts a cloud data protection module but not a cloud application client in accordance with an embodiment of the present invention.

FIG. 8 schematically shows further details of an on-premise network component that hosts the cloud data protection module 220 but not the cloud application client 210 in accordance with an embodiment of the present invention. In the example of FIG. 8, the on-premise network component is the router 320 that is operating as part of the cloud data protection system of FIG. 4. The cloud data protection module 220 can be implemented as embedded firmware of the router 320, for example. This makes the cloud data protection module 220 relatively easy to implement in a SOHO environment. An optional encrypted search server computer system is not shown in the example of FIG. 8 for clarity of illustration. In the example of FIG. 8, the router 320 is within the same private computer network as the client device 311.

In the example of FIG. 8, the cloud data protection module 220 running on the router 320 comprises the application hooks 511, the key handler 512, the cryptography module 513, and the authentication module 514. The application hooks 511 operate in the same manner as in the example of FIG. 7, except that in the example of FIG. 8 the application hooks 511 send and receive plaintext data to and from the client device 311 over the private computer network (see arrow 521). The application hooks 511 can also receive other data from the client device 311, such as biometrics input provided by the customer to the client device 311 (312; see arrow 522). The application hooks 511 can send and receive plaintext data to and from the client device 311 by routing, for example.

The cloud data protection module 220 can additionally include an access control list 515 that indicates software or devices that are authorized to receive data from the router 320. When installed on a router (but not necessarily on a proxy server computer system), the access control list 515 can also provide firewall functionality by blocking data from unauthorized network components.

As before, the key handler 512 communicates with the key server computer system 360 to store an encrypted encryption key and to retrieve the encrypted encryption key as needed (see arrow 524). The key handler 512 can communicate with the key server computer system 360 over the Internet. The cryptography module 513 encrypts plaintext data and plaintext encryption key into encrypted data and encrypted encryption key, respectively. The cryptography module 513 can send and receive encrypted data to and from the cloud computer system 340 over the Internet (see arrow 525). The authentication module 514 verifies that the customer is authorized to use the cloud data protection system by receiving and authenticating the customer's credential. The authentication module 514 can receive the customer's credential from the identity server computer system 350 over the Internet (see arrow 523) or from the client device 311 (e.g., biometrics input or manual keyboard entry of the customer), for example. The authentication module 514 can consult the access control list for further verification that the client device 311 is authorized to receive plaintext data from the cloud protection module 220.

Figure 9:
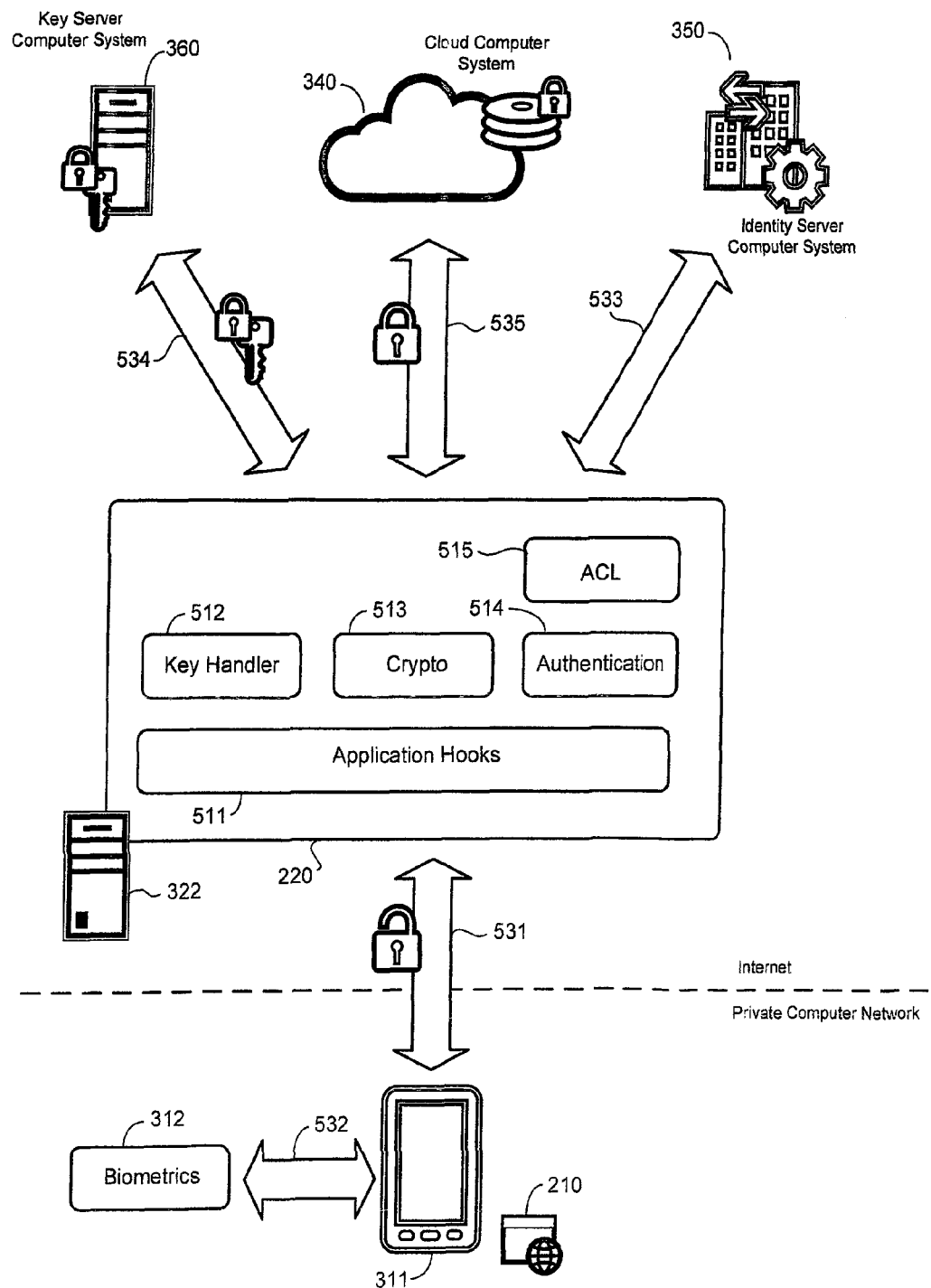
FIG. 9 shows a schematic diagram of an off-premise network component that hosts a cloud data protection module but not a cloud application client in accordance with an embodiment of the present invention.

FIG. 9 schematically shows further details of an off-premise network component that hosts the cloud data protection module 220 but not the cloud application client 210 in accordance with an embodiment of the present invention. In the example of FIG. 9, the off-premise network component is the proxy server computer system 322 that is operating as part of the cloud data protection system of FIG. 5. An optional encrypted search server computer system is not shown in the example of FIG. 9 for clarity of illustration. In the example of FIG. 9, the customer's client device 311 can be within or outside the customer's private computer network.

In the example of FIG. 9, the cloud data protection module 220 running on the router 320 comprises the previously described application hooks 511, key handler 512, cryptography module 513, authentication module 514, and access control list 515. The application hooks 511 operate in the same manner as in the example of FIG. 8, except that in the example of FIG. 9 the application hooks 511 send and receive plaintext data to and from the client device 311 over the Internet (see arrow 531). The application hooks 511 can also receive other data from the client device 311, such as biometrics input provided by the customer to the client device 311 (312; see arrow 532). The application hooks 511 can send and receive plaintext data to and from the client device 311 by being configured as a proxy server, for example.

As before, the key handler 512 communicates with the key server computer system 360 to store an encrypted encryption key and to retrieve the encrypted encryption key as needed (see arrow 534). The key handler 512 can communicate with the key server computer system 360 over the Internet. The cryptography module 513 encrypts plaintext data and plaintext encryption key into encrypted data and encrypted encryption key, respectively. The cryptography module 513 can send and receive encrypted data to and from the cloud computer system 340 over the Internet (see arrow 535). The authentication module 514 verifies that the customer is authorized to use the cloud data protection system by receiving and authenticating the customer's credential. The authentication module 514 can receive the customer's credential from the identity server computer system 350 over the Internet (see arrow 533) or from the client device 311 (e.g., biometrics input or manual keyboard entry of the customer), for example. The authentication module 514 can consult the access control list for further verification that the client device 311 is authorized to receive plaintext data from the cloud protection module 220.

Figure 10:
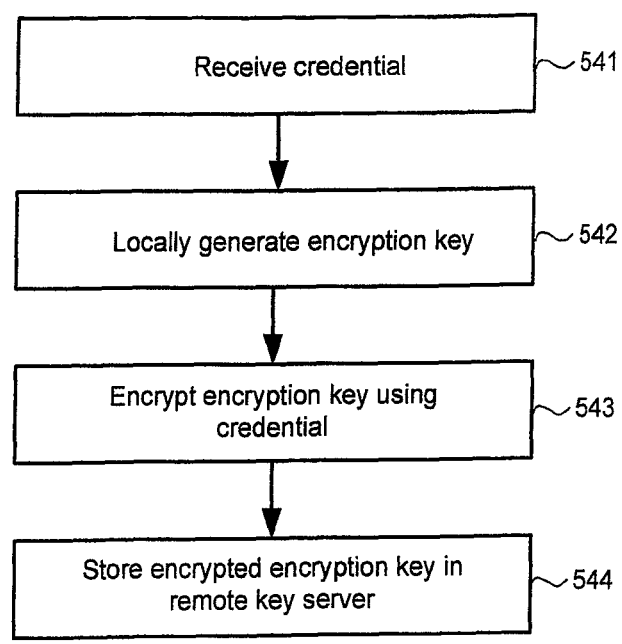
FIGS. 10-12 show flow diagrams of methods that can be performed to protect data stored in the cloud in accordance with embodiments of the present invention.
Figure 11:
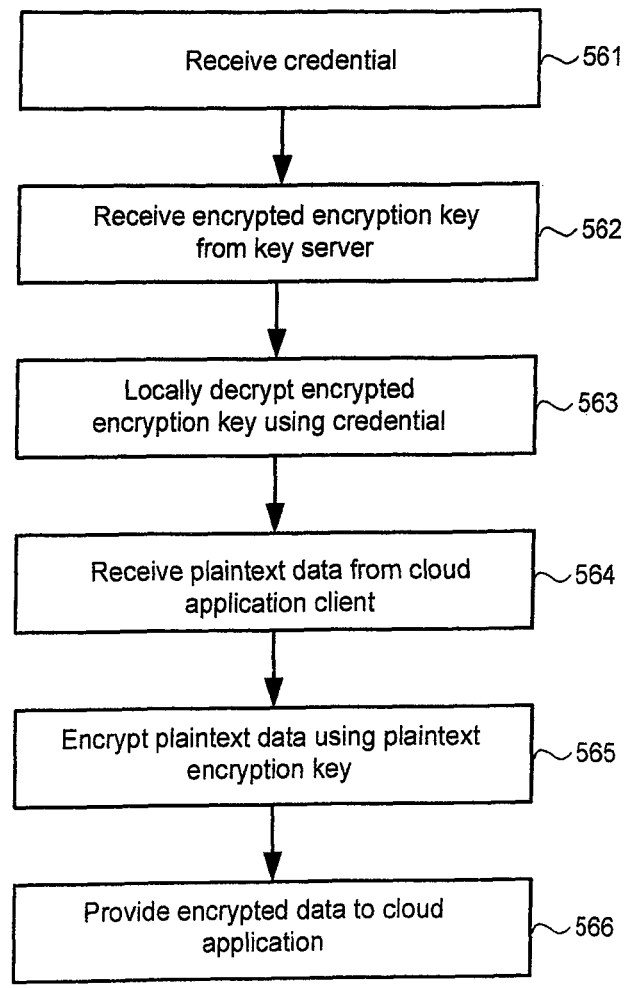
Figure 12:
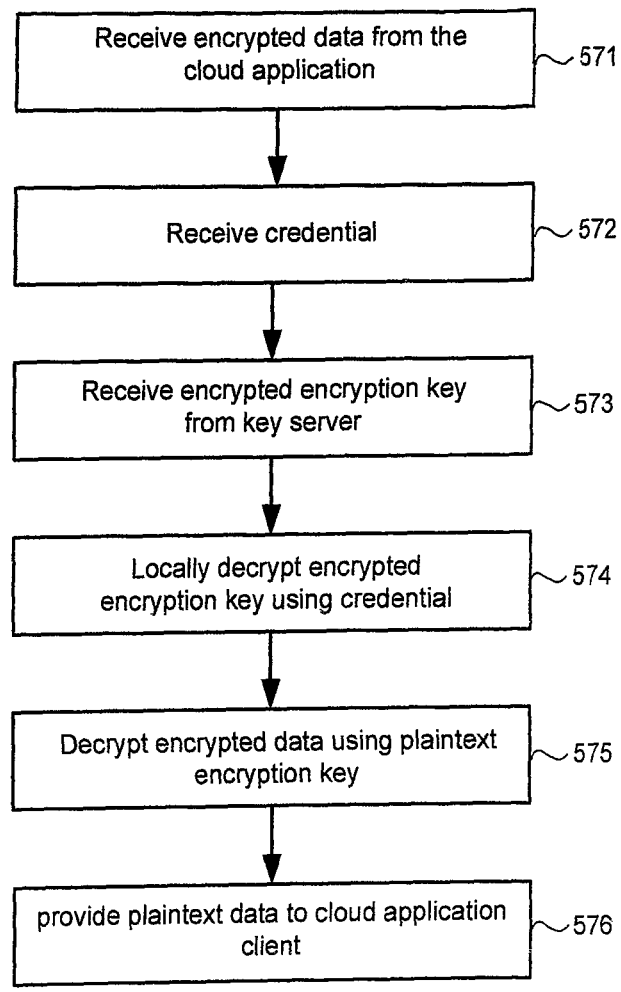

FIGS. 10-12 show flow diagrams of methods that can be performed to protect data stored in the cloud in accordance with embodiments of the present invention. The methods of FIGS. 10-12 can be performed by previously-described components. Other components can also be employed without detracting from the merits of the present invention.

Referring first to FIG. 10, therein shows a flow diagram of a method of securing an encryption key that is employed to encrypt data stored in the cloud in accordance with an embodiment of the present invention. In the example of FIG. 10, a first computing device (e.g., a mobile computing device, a router, a server computer system, or some other computer) receives a credential of a customer that has subscribed to use a cloud application for data storage (step 541). The customer's credential received by the first computing device can be a biometric (e.g., fingerprint) of the customer, an identifier (e.g., a password, username, or both) of the customer received from an identity server computer system (e.g., by federated authentication), a password that is manually entered by the customer into the first computing device, or some other user identifier/authenticator.

The first computing device generates an encryption key locally in the first computing device (step 542). For example, the first computing device can locally generate a private key/public key pair for the customer using a public-key encryption algorithm. The first computing device encrypts the encryption key (e.g., the customer's private key) using the customer's credential as a symmetric key (step 543). For example, the first computing device can encrypt the encryption key with the credential using a symmetric key encryption algorithm. The first computing device stores the encrypted encryption key in a remote key server, e.g., by transmitting the encrypted encryption key to a key server computer system over the Internet (step 544). In one embodiment, the first computing device does not store the plaintext version of the encryption key in non-volatile memory (e.g., on a hard drive). In that embodiment, the first computing device keeps the plaintext encryption key in volatile memory, such as in random access memory (RAM), when in use.

FIG. 11 shows a flow diagram of a method of storing encrypted data in the cloud in accordance with an embodiment of the present invention. The flow diagram of FIG. 11 follows the flow diagram of FIG. 10. In the example of FIG. 11, the first computing device receives the customer's credential (step 561). The first computing device receives the customer's encrypted encryption key from the key server (step 562) and decrypts the encrypted encryption key locally in the first computing device using the customer's credential (step 563). The first computing device keeps the resulting plaintext encryption key in volatile memory. This ensures that the plaintext encryption key is deleted from the first computing device when the first computing device is rebooted or powered down. The first computing device also removes the plaintext encryption key from the first computing device when the customer's signs off the cloud data protection system or after a predetermined period of inactivity.

The first computing device receives plaintext data from a cloud application client, which works in conjunction with a cloud application server for storing data in the cloud (step 564).

The first computing device can be running at least a cloud data protection module but not necessarily the cloud application client. For example, the cloud data protection module and the cloud application client can be running on the first computing device, in which case the cloud application client provides the plaintext data to the cloud protection module by interprocess communication or some other way by which processes on the same computer communicate. In that example, the first computing device can be a mobile computing device, such as a smartphone or tablet running a mobile operating system, and the cloud data protection module and the cloud application client are provided as an app wherein the cloud data protection module wraps the cloud application client.

As another example, the cloud data protection module can be running on the first computing device and the cloud application client is running on a separate second computing device. In that example, the first computing device can receive the plaintext data from the second computing device over a private computer network when the first computing device is on-premise as in the embodiment of FIG. 8 (e.g., as a router 320) or over the Internet when the first computing device is off-premise as in the embodiment of FIG. 9 (e.g., as a proxy server computer system 322).

Using the plaintext encryption key, the first computing device encrypts the plaintext data received from the cloud application client (step 565) and forwards the resulting encrypted data to the cloud application over the Internet (step 566).

FIG. 12 shows a flow diagram of a method of decrypting encrypted data received from the cloud in accordance with an embodiment of the present invention. The flow diagram of FIG. 12 follows the flow diagram of FIG. 11. In the example of FIG. 12, the first computing device receives the encrypted data from the cloud application over the Internet (step 571). The first computing device receives the customer's credential (step 572). The first computing device receives the customer's encrypted encryption key from the key server over the Internet (step 573) and decrypts the encrypted encryption key locally in the first computing device using the customer's credential (step 574). The first computing device keeps the resulting plaintext encryption key in volatile memory. The first computing device decrypts the encrypted data using the plaintext encryption key (step 575) and then forwards the resulting plaintext data to the cloud application client (step 576).

Methods and systems for protecting data stored in the cloud have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system comprising:
a client device that is configured to receive a credential from a customer who uses a cloud application hosted by a cloud computer system, to forward the credential to a remotely located intermediary computer system, to run a cloud application client, and to forward plaintext data from the cloud application client to the intermediary computer system;
the intermediary computer system that is configured to receive the credential, to receive the plaintext data, to locally generate a plaintext encryption key for the customer, to use the plaintext encryption key to encrypt the plaintext data into encrypted data, to use the credential to encrypt the plaintext encryption key to generate an encrypted encryption key, to forward the encrypted encryption key to a remotely located key server computer system, and to forward the encrypted data to the cloud computer system; and
the key server computer system that is configured to receive the encrypted encryption key and to store the encrypted encryption key.

2. The system of claim 1, wherein the intermediary computer system comprises a router.

3. The system of claim 2, wherein the router serves as a gateway or a firewall.

4. The system of claim 1, wherein the intermediary computer system is on-premise within a same private computer network as the client device.

5. The system of claim 1, wherein the intermediary computer system comprises a proxy server.

6. The system of claim 1, wherein the intermediary computer system is off-premise outside a private computer network of the client device.

7. The system of claim 1, further comprising:
the cloud computer system that is configured to host the cloud application that works in conjunction with the cloud application client, to receive the encrypted data over the Internet, and to store the encrypted data.

8. The system of claim 1, wherein the intermediary computer system is configured to receive the encrypted encryption key forwarded back by the key server computer system, to decrypt the encrypted encryption key using the credential to recover the plaintext encryption key, to receive the encrypted data forwarded back by the cloud computer system, and to decrypt the encrypted data using the plaintext encryption key to recover the plaintext data.

9. The system of claim 1, wherein the client device is a mobile computing device that runs a mobile operating system and the cloud application client is a mobile application that is running on the client device.

10. The system of claim 1, wherein the credential comprises biometric data of the customer.

11. A computer-implemented method of protecting data stored in the cloud, the method comprising:
receiving, from a client device over a computer network, plaintext data of a cloud application client of a cloud application hosted by a cloud computer system;
locally generating a plaintext encryption key for the customer;
encrypting plaintext data of the cloud application client using the plaintext encryption key to generate encrypted data;
forwarding the encrypted data to the cloud computer system;
encrypting the plaintext encryption key using a credential of the customer to generate an encrypted encryption key; and
forwarding the encrypted encryption key to a key server computer system.

12. The method of claim 11, wherein the credential comprises biometric data of the customer.

13. The method of claim 11, wherein the credential comprises federated identity authentication of the customer.

14. The method of claim 11, further comprising:
retrieving the encrypted data from the cloud computer system over the computer network;
retrieving the encrypted encryption key from the key server computer system;
decrypting the encrypted encryption key using the credential of the customer to recover the plaintext encryption key; and
decrypting the encrypted data using the plaintext encryption key to recover the plaintext data.

15. A system comprising:
an intermediary computer system that receives a credential of a customer who uses a cloud application hosted by a cloud computer system, receives plaintext data of a cloud application running on a client device that is employed by the customer to access the cloud application, uses a plaintext encryption key to encrypt the plaintext data into encrypted data, uses the credential of the customer to encrypt the plaintext encryption key to generate an encrypted encryption key, provides the encrypted encryption key to a remotely located key server computer system, and forwards the encrypted data to the cloud computer system.

16. The system of claim 15, wherein the credential of the customer comprises biometric data of the customer.

17. The system of claim 15, wherein the credential of the customer comprises federated identity authentication of the customer.

18. The system of claim 15, further comprising:
the key server computer system that receives the encrypted encryption key and stores the encrypted encryption key.

19. The system of claim 15, further comprising:
the cloud computer system that hosts the cloud application that works in conjunction with the cloud application client that runs on the client device, receives the encrypted data over the Internet, and stores the encrypted data.

20. The system of claim 15, wherein the intermediary computer system is on-premise within a same private computer network as the client device.

\* \* \* \* \*